(12) United States Patent
Morris

(10) Patent No.: US 8,307,017 B1
(45) Date of Patent: Nov. 6, 2012

(54) OBJECT-LEVEL MIRRORING

(75) Inventor: J. Mark Morris, Poway, CA (US)

(73) Assignee: Teradata US, Inc., Dayton, OH (US)

( * ) Notice: Subject to any disclaimer, the term of this patent is extended or adjusted under 35 U.S.C. 154(b) by 2537 days.

(21) Appl. No.: 11/005,695

(22) Filed: Dec. 7, 2004

(51) Int. Cl.
*G06F 17/30* (2006.01)
(52) U.S. Cl. .................................................... 707/812
(58) Field of Classification Search .................. None
See application file for complete search history.

(56) References Cited

U.S. PATENT DOCUMENTS

| | | | | |
|---|---|---|---|---|
| 6,081,812 A | 6/2000 | Boggs et al. | ........... | 707/202 |
| 6,654,862 B2 | 11/2003 | Morris | ........... | 711/162 |
| 7,181,370 B2 * | 2/2007 | Furem et al. | ........... | 702/188 |
| 7,225,308 B2 * | 5/2007 | Melament et al. | ........... | 711/162 |

* cited by examiner

*Primary Examiner* — Cam-Linh Nguyen
(74) *Attorney, Agent, or Firm* — Howard Speight

(57) ABSTRACT

Methods, computer programs, and database systems for protecting one or more database objects are disclosed. The methods include designating one or more database objects for protection and characterizing one or more data storage units by a set of dimensions. The method include, for one or more database objects designated for protection: selecting one or more data storage units to store protection information for the database object based on one or more dimensions, and storing protection information in the one or more selected data storage units.

45 Claims, 13 Drawing Sheets

OBJECT-LEVEL MIRRORING

CROSS REFERENCE TO RELATED APPLICATIONS

This application is related to the United States Patent Application entitled "Optimizing Allocator for Database Objects," by J. Mark Morris, Ser. No. 11/006,016, filed on even date.

This application is related to U.S. Pat. No. 6,654,862, entitled "High Performance Disk Mirroring" by J. Mark Morris. This application is related to U.S. Pat. No. 6,081,812, entitled "Identifying At-Risk Components In Systems With Redundant Components" by Gary Lee Boggs, et al.

BACKGROUND

Database data storage subsystems may store various database objects on one or more data storage units. The data storage units may have varying capabilities relating to reliability, speed, and other characteristics. Likewise, database objects may have different needs with respect to the capabilities of the data storage units.

SUMMARY

In general, in one aspect, the invention features a method of protecting one or more database objects. The method includes designating one or more database objects for protection and characterizing one or more data storage units by a set of dimensions. The method further includes, for one or more database objects designated for protection: selecting one or more data storage units to store protection information for the database object based on one or more dimensions and storing protection information in the one or more selected storage units.

Implementations may include one or more of the following. Characterizing one or more data storage units by a set of dimensions may include characterizing one or more data storage units by a reliability dimension. Characterizing one or more data storage units by the reliability dimension may include characterizing one or more data storage units based on one or more of the following:
 a Mean Time Between Failures (MTBF);
 a number of data paths connected to the data storage unit;
 a cabinet that houses the data storage unit;
 the interconnects of the cabinet that houses the data storage unit;
 a chassis that houses the data storage unit;
 the data storage facility that houses the data storage unit;
 whether the data storage unit supports atomic writes;
 whether the data storage unit is volatile;
 whether the data store unit is path failure protected; and
 one or more power grids connected to the data storage unit.

Characterizing one or more data storage units by a set of dimensions may include characterizing one or more data storage units by a performance dimension. Characterizing one or more data storage units by a performance dimension may include characterizing one or more data storage units based on one or more of the following:
 a seek time;
 a transfer rate;
 a rotational speed;
 one or more response time statistics; and
 one or more expected response time as the data storage unit is filled, one or more interconnect speeds.

Characterizing one or more data storage units by the performance dimension may include characterizing one or more data storage units by an Input/Output mix by one or more of a read/write mix or a request size mix.

Characterizing one or more data storage units by a set of dimensions may include characterizing one or more data storage units by a capacity dimension or a longevity dimension. Two or more data storage units may be characterized by a common fault dimension.

The method may include characterizing one or more database objects designated for protection based on a set of dimensions. Characterizing one or more database objects by a set of dimensions may include characterizing one or more database objects based on one or more dimensions, such as a reliability dimension, a performance dimension, a size dimension, and a longevity dimension.

The method may include determining a cost to store the recovery information to one or more data storage units.

Storing protection information in the one or more date storage units may include mirroring the database object on the one or more data storage units.

In general, in another aspect, the invention features a computer program, stored on a tangible storage medium, for use in protecting one or more database objects. The computer program includes executable instructions that cause a computer to designate one or more database objects for protection and characterize one or more data storage units by a set of dimensions. The computer program includes further executable instructions that cause the computer to, for one or more database objects designated for protection: select one or more data storage units to store protection information for the database object based on one or more dimensions and store protection information in the one or more selected data storage units.

In general, in another aspect, the invention features an information handling system that includes one or more controllers and one or more data storage facilities including one or more data storage units. Each of the one or more controllers providing access to one or more data storage facilities. The information handling system further includes a process for execution on one or more of the controllers for allocating one or more database objects to one or more data storage units, the process including designating one or more database objects for protection and characterizing one or more data storage units by a set of dimensions. The process further includes, for one or more database objects designated for protection: selecting one or more data storage units to store protection information for the database object based on one or more dimensions and storing protection information in the one or more selected data storage units.

DETAILED DESCRIPTION

Figure 1:
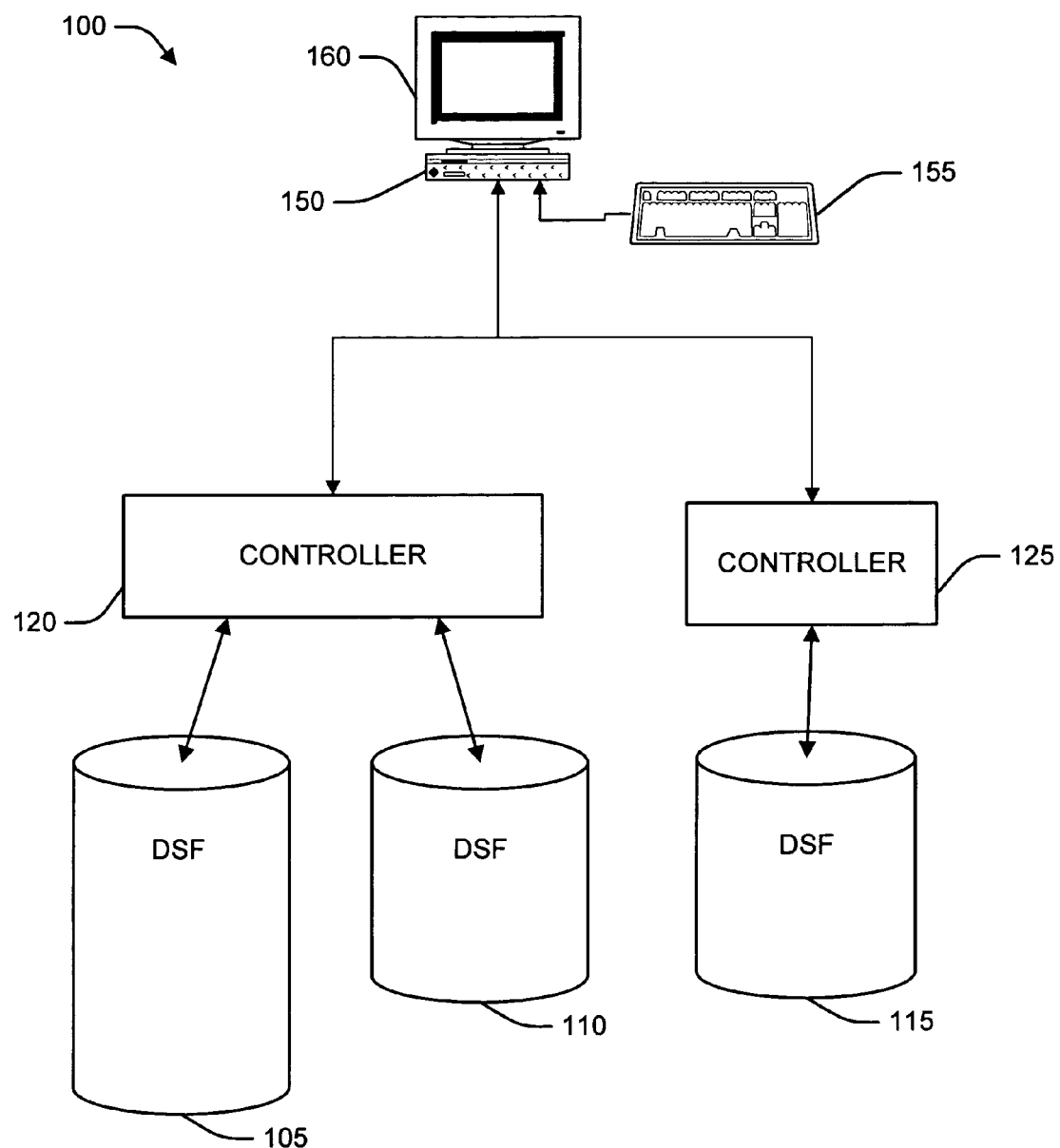
FIG. 1 is a block diagram of an information handling system.

The techniques for protecting database object to data storage units disclosed herein have particular application, but are not limited, to information handling systems, including, for example, but not limited to database systems. FIG. 1 shows a sample architecture for an information handling system 100. The information handling system 100 includes data storage facilities (DSFs) 105, 110, and 115. The data storage facilities store and retrieve data from media. DSFs 105 and 110 are controlled by controller 120, while DSF 115 is controlled by controller 125. The controllers 120 and 125 direct the operation of the DSFs 105, 110, and 115. In general, each of the controllers 120 and 125 may control the operation of one or more DSFs. The controllers 120 and 125 also control the flow of data into and out of the DSFs 105, 110, and 115.

The information handling system 100, shown in FIG. 1, also includes a client system 150 to access, process, or manipulate data on the DSFs 105, 110, and 115. The client system 150 communicates with the controllers 120 and 125 to access the DSFs 105, 110, and 115. The client system 150 includes one or more input/output devices, including user interface input/output devices such as keyboard 155 and monitor 160. An example client system 150 includes one or more input/output devices such as a network interface to communicate with, for example, the controller 120 and 125 or other client systems. Yet another example client system 150 does not include user interface input/output devices. Other example information handling systems 100 operate without a client system.

Each of the DSFs 105, 110, and 115 are located at a geographic location. In one example implementation, each of the DSFs 105, 110, and 115 are located at different geographic locations. In other implementations, one or more of the DSFs 105, 110, and 115 are located at the same geographic location.

Figure 2:
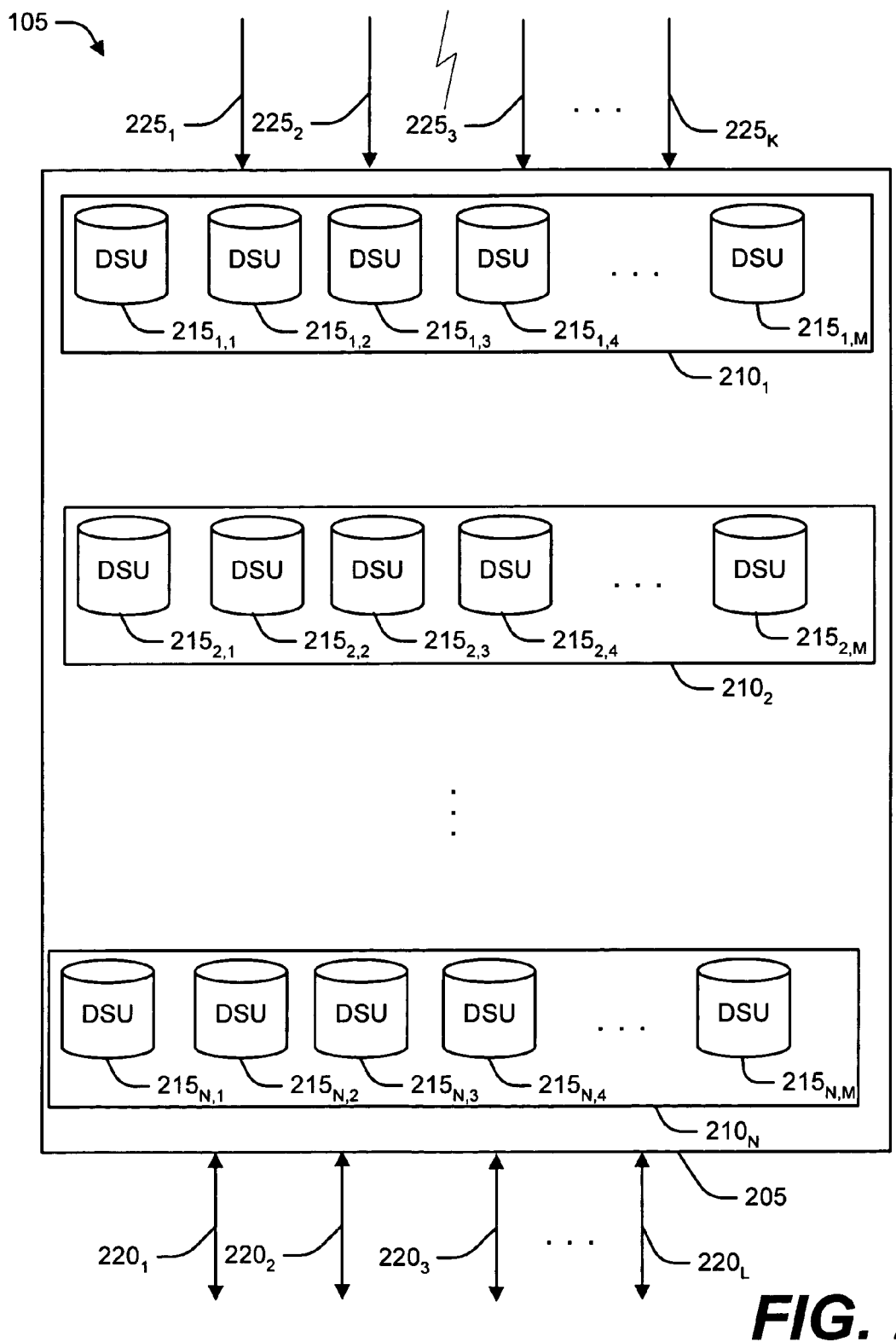
FIG. 2 is a block diagram of data storage units.

An example DSF, shown generally at 105, is shown in FIG. 2. The DSF 105 shown in FIG. 2 includes a chassis 205. In general, the DSF 105 includes one or more cabinets, which, in turn, include one or more chassis. In some implementations, the cabinets are referred to as rack-mounted cabinets. The chassis 205 includes N blades $210_1 \ldots _N$ and each blade includes M data storage units (DSUs), such as DSUs $215_{1,1 \ldots 1,M}$. In other implementations, the blades $210_{1 \ldots N}$ include varying numbers of DSUs per blade. In certain implementations, one or more of the DSUs $215_{1,1 \ldots N,M}$ are a single media unit (e.g., a disk). In other implementations, one or more of the DSUs $215_{1,1 \ldots N,M}$ include multiple media units (e.g., an array of disks). In other implementations, one or more disks one or more of the DSUs $215_{1,1 \ldots N,M}$ include a partial media unit (e.g., one or more sectors or other portions of a disk). In certain implementations, one or more of the DSUs $215_{1,1 \ldots N,M}$ are RAM disks or solid state disks. In some implementations, the solid-state disks use non-volatile memory, such as flash memory.

In general each of the DSUs $215_{1,1 \ldots N,M}$ include one or more data paths to facilitate communications between the DSUs $215_{1,1 \ldots N,M}$ and other portions of the information handling system 100. In certain implementations one or more of the DSUs $215_{1,1 \ldots N,M}$ within one of the blades $210_{1 \ldots N}$ are in communication with each other. In other implementations one or more of the DSUs $215_{1,1 \ldots N,M}$ within the chassis 205 are in communication with each other. The chassis 205 is in communication with one or more of the controllers 120 and 125 or one or more of the other DSFs 110 and 115 through data interconnections $220_1 \ldots _L$. The chassis 205 receives power from power grids $225_1 \ldots _K$. The chassis 205 may further include one or more cabinets of DSUs $215_{1,1 \ldots N,M}$.

The data for storage in the DSUs $215_{1,1 \ldots N,M}$ includes one or more database objects. In general, a database object is a unit of a database such as, a database, a table, a partitions of a table, a row, a column, an index, a log, a journal, a spool, or another unit of the database.

Figure 3:
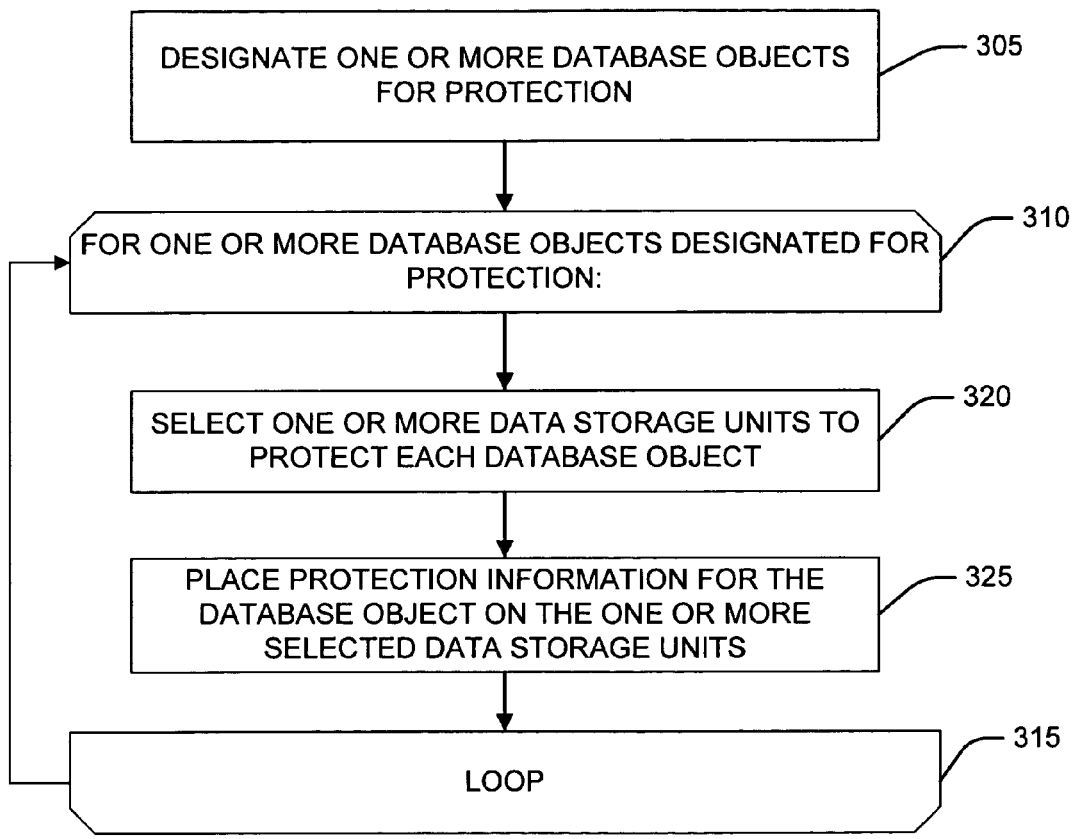
FIGS. 3-17 are flow charts of a system for protecting database objects.

An example data protection system for storing protection information on one or more data storage units is shown in FIG. 3. The system designates one or more database objects for protection (block 305). The system enters a loop (blocks 310 and 315) and loops once for each database object designated for protection in block 305. Within the loop, the system selects one or more of the DSUs $215_{1,1 \ldots N,M}$ to store protection information for the database object (block 320, which is shown in greater detail in FIG. 4) and places the protection information on the one or more selected DSUs $215_{1,1 \ldots N,M}$ (block 325, which is shown in greater detail in FIG. 17).

The system may protect objects of different granularities. One example system protects tables, while another example system protects columns. Another example system protects some database objects on a table-by-table basis, while it protects other database objects on a row-by-row basis. For example, one example system protects one or more rows from one or more tables to DSUs $215_{1,1 \ldots N,M}$. Other example database objects include sub-tables, partitions of tables, classes of tables, collections of tables, indexes, logs, depots, journals, and other database objects.

Figure 4:
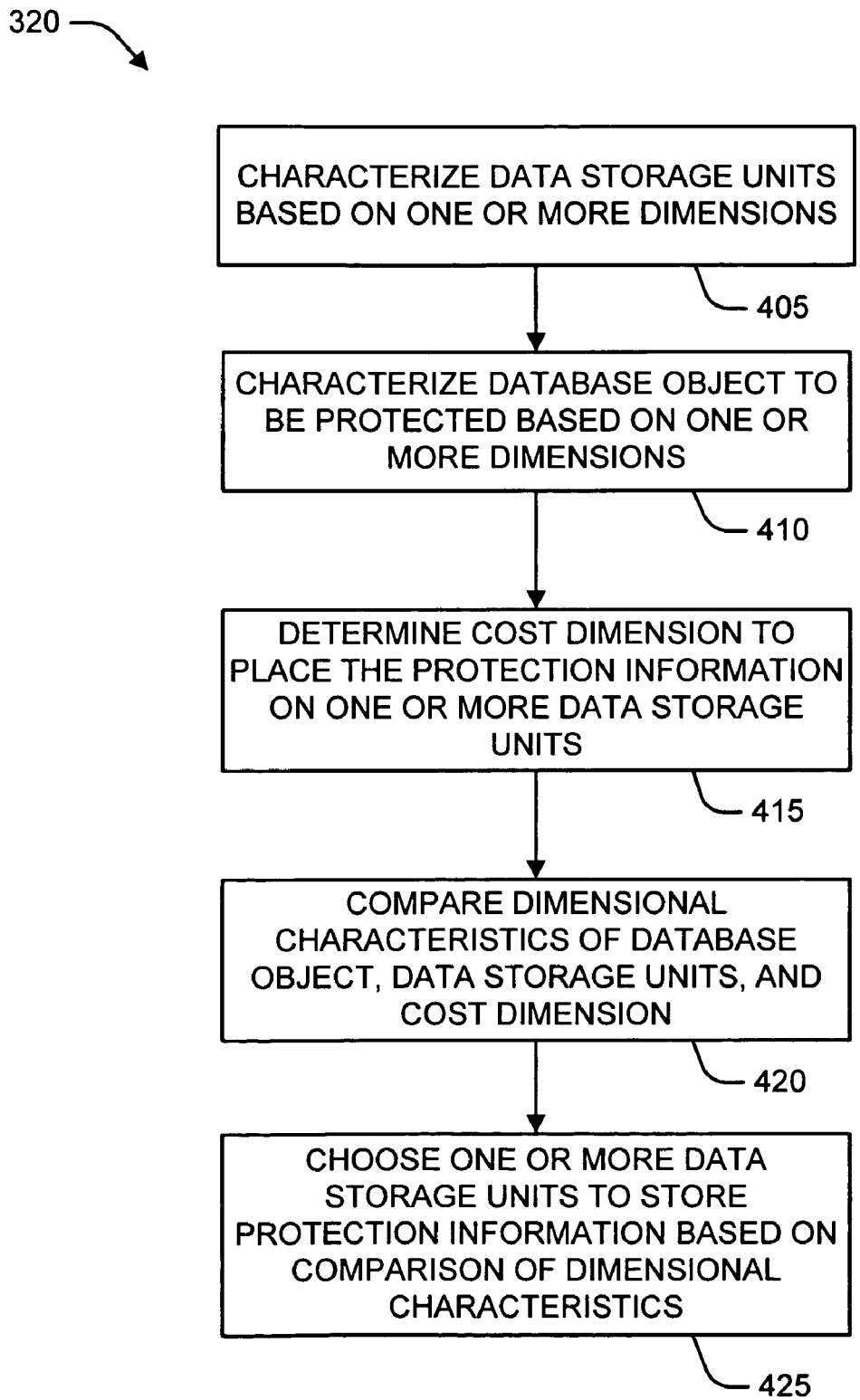

An example system for selecting one or more DSUs $215_{1,1 \ldots N,M}$ to store the protection information for the database object (block 320) is shown in FIG. 4. The system characterizes one or more of the DSUs $215_{1,1 \ldots N,M}$ based on one or more dimensions (block 405, which is shown in greater detail in FIG. 5). The system characterizes the database object to be stored based on one or more dimensions (block 410, which is shown in greater detail in FIG. 11). The system determines a cost dimension to place the protection information for the database object on one or more of the DSUs $215_{1,1 \ldots N,M}$ (block 415, which is shown in greater detail in FIG. 16). The system compares the dimensional characteristics of the one or more DSUs $215_{1,1 \ldots N,M}$ and the dimensional characteristics of the database object, considers the cost dimension (block 420) and, based on the dimensional characteristics, selects one or more of the DSUs $215_{1,1 \ldots N,M}$ to store the protection information for the database object (block 425).

Figure 5:
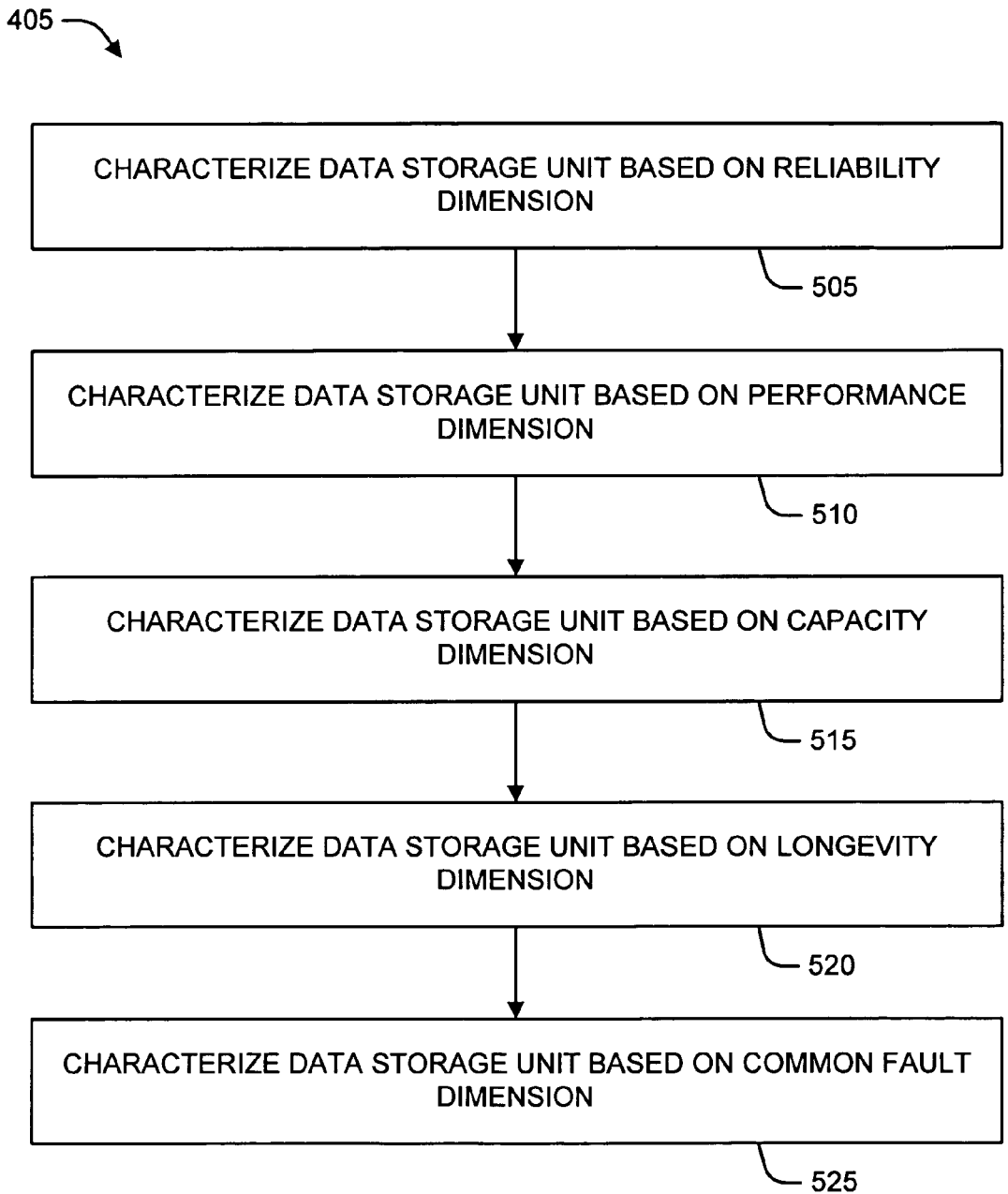

FIG. 5 shows an example system for characterizing each of the one or more DSUs $215_{1,1 \ldots N,M}$ based on one or more dimensions (block 405). For the purposes of clarity, a single one of the DSUs. $215_{1,1 \ldots N,M}$ will be referred to as a DSU 215. In some example systems, only a subset of DSUs $215_{1,1 \ldots N,M}$ are characterized. In other example systems, DSUs $215_{1,1 \ldots N,M}$ are characterized before determining where to assign the database object. In other implementations, the dimensional characteristics of the DSUs $215_{1,1 \ldots N,M}$ are stored and updated on demand, periodically, or according to a schedule. In certain implementations, one or more of the DSUs $215_{1,1 \ldots N,M}$ are analyzed in groups to characterize one or more of the DSUs $215_{1,1 \ldots N,M}$. For example, the system considers a group of two or more DSUs $215_{1,1 \ldots N,M}$ to determine one or more common fault dimensions between the DSUs $215_{1,1 \ldots N,M}$ in the group.

Figure 9:
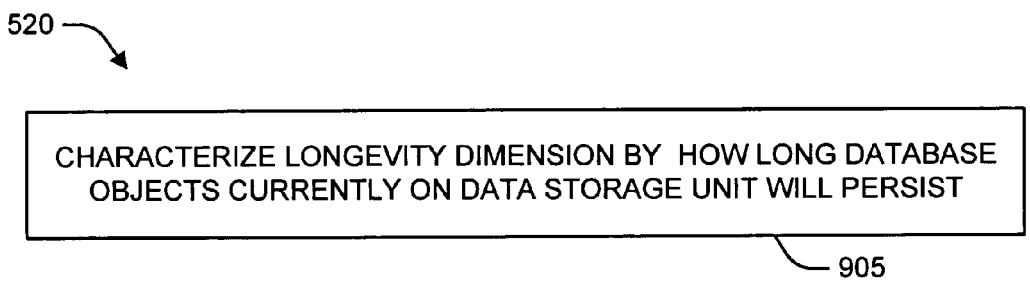
Figure 10:
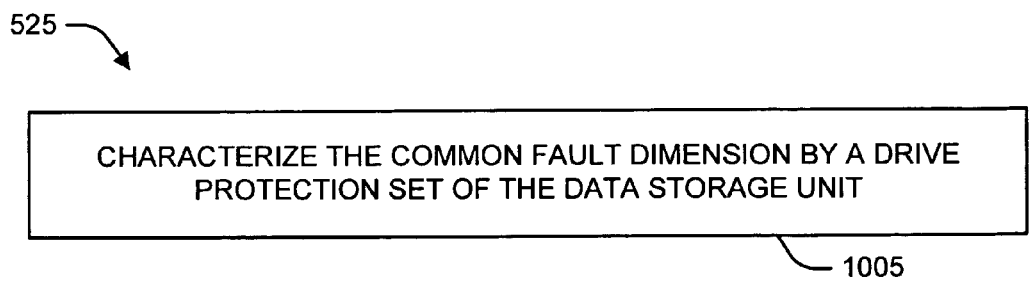

The example system for characterizing each DSU 215 (block 405) characterizes the DSU 215 based on a reliability dimension (block 505, which is shown in greater detail in FIGS. 6A and 6B), a performance dimension (block 510, which is shown in greater detail in FIG. 7), a capacity dimension (block 515, which is shown in greater detail in FIG. 8), a longevity dimension (block 520, which is shown in greater detail in FIG. 9), and a common fault dimension (block 525, which is shown in greater detail in FIG. 10). In certain implementations, one or more of block 505, 510, 515, 520, and 525 are omitted.

Figure 6A:
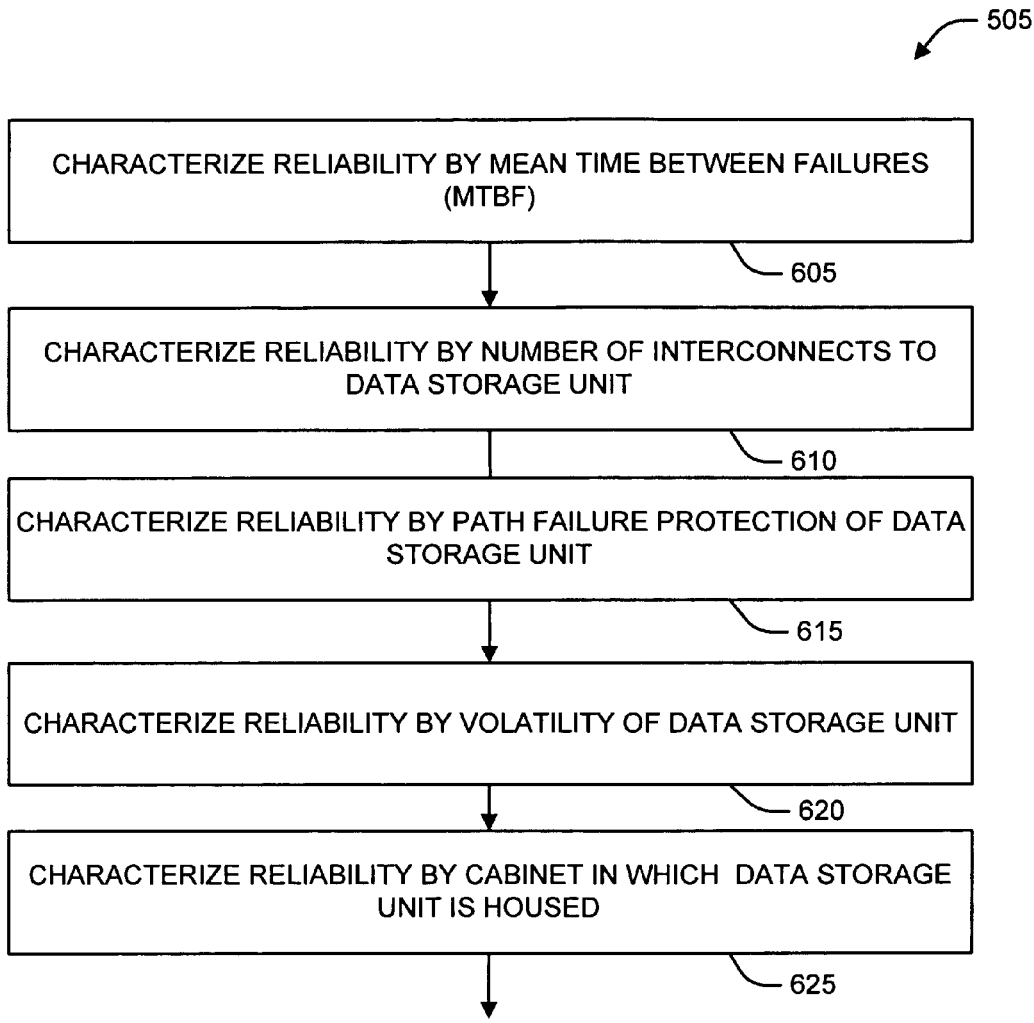
Figure 6B:
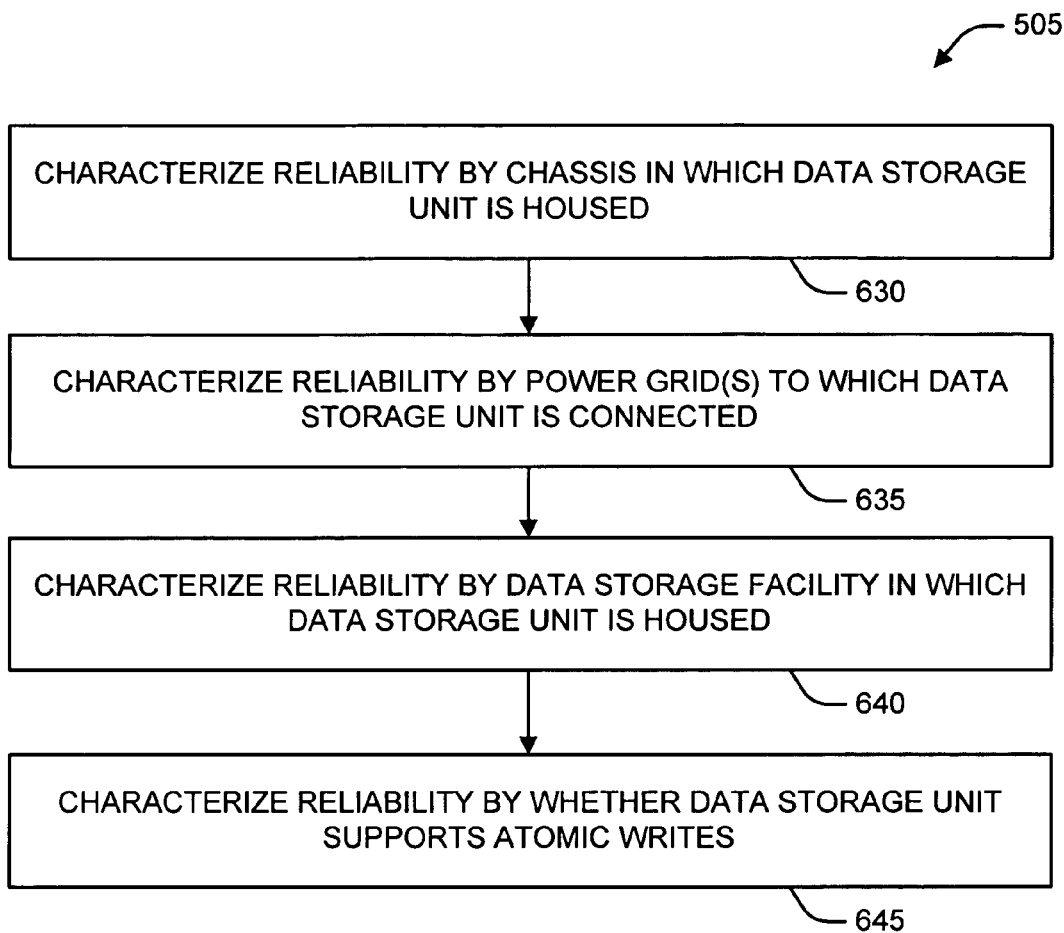

In general, the characterization of the reliability dimension of a DSU 215 reflects the likelihood that the DSU 215 will remain available for access and that the DSU 215 will retain a stored database object. In certain implementations, these two facets of the reliability dimension may be considered separately. In still other implementations, the reliability dimension may be split into even more sub-dimensions. An example system for characterizing the reliability dimension of the DSU 215 (block 505) is shown in FIGS. 6A and 6B. The example system characterizes the reliability by the following:

a mean time between failures (MTBF) (block 605, FIG. 6A);
 the number of data interconnects $220_{1 \ldots L}$ (block 610);
 path failure protection (block 615);
 volatility (block 620);
 the cabinet (block 625);
 the chassis 205 (block 630, FIG. 6B);
 the one or more power grids $225_{1 \ldots K}$ connected to the chassis (block 635);
 the data storage facility 105 (block 640); and
 whether the DSU 215 supports atomic writes (block 645).

In certain implementations, the system may omit one or more of block 605-640. In certain implementations, the DSU 215 is classified as path failure protected (block 615) if the DSU 215 is still accessible in the event of a single failed storage path to the device. In certain implementations, the DSU 215 is classified as non-volatile if the DSU 215 will maintain stored data though a power loss. Otherwise, the DSU is classified as volatile.

In certain implementations, the reliability properties of the DSU 215 based on block 605-630 is considered in isolation from other DSFs $215_{1,1 \ldots N,M}$. For example, the system may consider the number of power grids $205_{1 \ldots K}$ connected to the chassis 205 housing DSF 215. In other implementations, the system considers the relation of the DSF 215 to the other DSFs $215_{1,1 \ldots N,M}$. For example, if the system is seeking to assign the database object and a mirror of the database object, it may seek the greatest diversity in power grids $205_{1 \ldots K}$ between the DSF 215 for the primary storage of the database object and the DSF 215 for the mirror of the database object. This consideration of multiple DSFs $215_{1,1 \ldots N,M}$ may be performed in regard to the common fault dimension (block 525).

Figure 7:
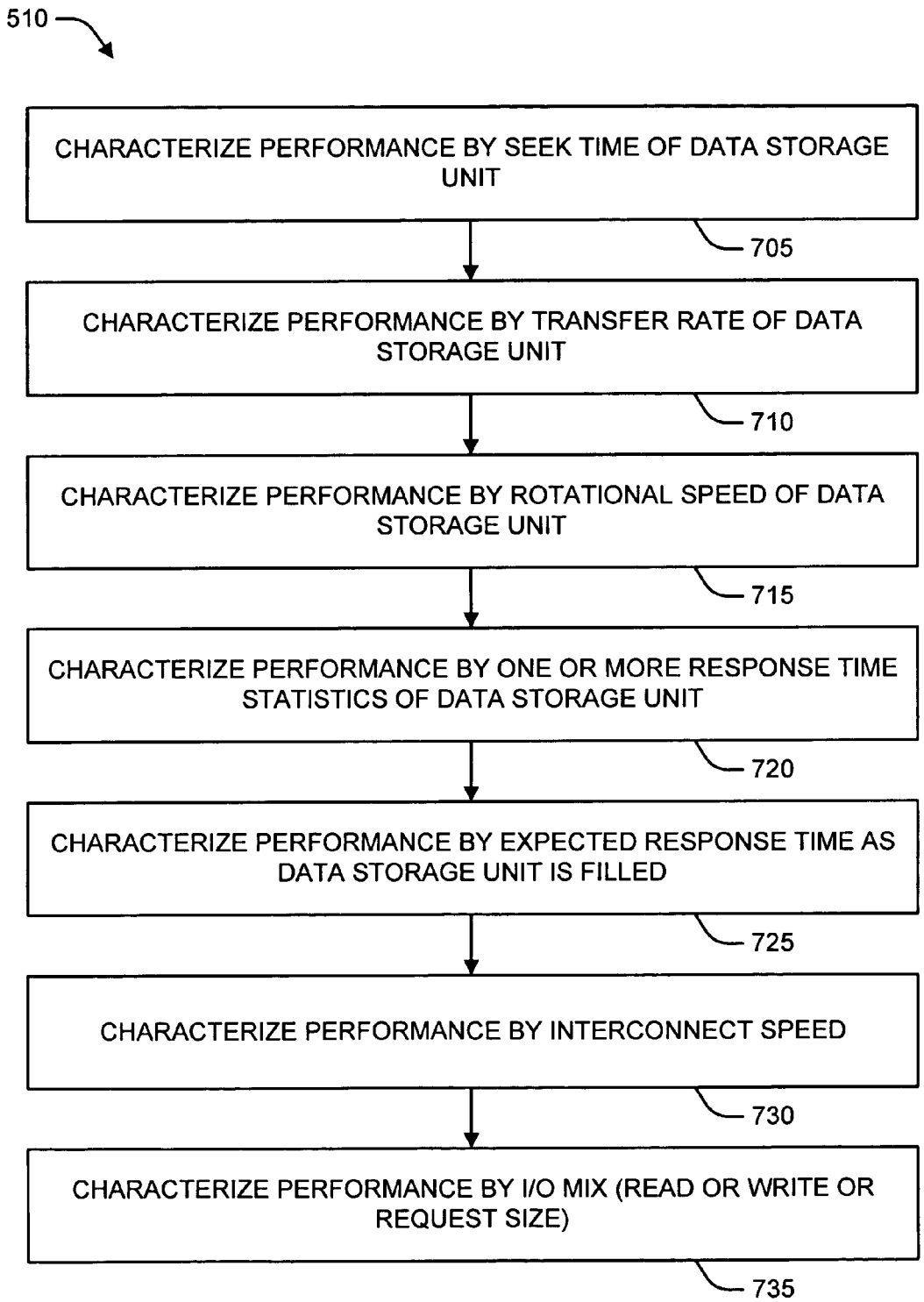

An example system for characterizing the DSU 215 based on the performance dimension (block 510) is shown in FIG. 7. In general, the performance dimension characterizes both latency and throughput. In certain implementations, these sub-dimensions of performance are considered separately. The system uses the following properties of the DSU 215 to characterize its performance dimension:

a seek time (block 705);
 a data transfer rate (block 710);
 a rotational speed (block 715);
 one or more response time statistics (block 720);
 one or more expected response times as the DSU 215 is filled (block 725);
 a data interconnect speed (block 730); and
 an Input/Output (I/O) mix (e.g., read/write or request size) (block 735).

In certain implementations, one or more of block 705-735 are omitted.

In some implementations of classifying the DSU 215 based on the performance dimension, the system may classify the database object into one or more discrete classifications. For example, the system may classify the database object by a "temperature," based on the performance attributes of the database object. Example temperatures may include hot-pacing, hot, warm, and cool. In other implementations, a greater number of discrete classifications are used to classify the DSU 215 based on its performance dimensions. In still other implementations, the performance dimension of the DSU 215 may be characterized by a continuous measure.

Figure 8:

An example system of characterizing the DSU 215 based on the capacity dimension (block 515) is shown in FIG. 8. The example system characterizes the capacity dimension by the free space on the DSU 215 (block 805).

An example system of characterizing the DSU 215 based on the longevity dimension (block 520) is shown in FIG. 9. The example system characterizes the longevity dimension of the DSU 215 by how long database objects that are current on the DSU 215 will persist (block 905). For example, the DSU 215 may currently hold a scratch table that is being operated on, but will be destroyed in the future. In some implementations, the effects of the scratch table's current existence and future deallocation are considered when determining whether to allocate the database object to the DSU 215.

In some implementations, one or more of the DSUs $215_{1,1 \ldots N,M}$ are grouped into two or more drive protection sets and the database object and the protection information (e.g., a mirror of the database object) are stored in DSUs $215_{1,1 \ldots N,M}$ that are members the same drive protection set. In one example system for characterizing the common fault dimension of the DSU 215 (block 525), which is shown in FIG. 10, the system considers the drive protection set that includes the DSU 215 (block 1005).

In other example systems for characterizing the common fault dimension of the DSU 215, the system considers the diversity in resources (e.g., power grids $225_{1 \ldots K}$ or data interconnections $220_{1 \ldots L}$) between the DSU 215 and one or more other DSUs $215_{1,1 \ldots N,M}$. Some example systems attempt to maximize the diversity in resources between a DSU 215 that contains the database object and another DSU 215 that contains the protection information for the database object.

Figure 11:
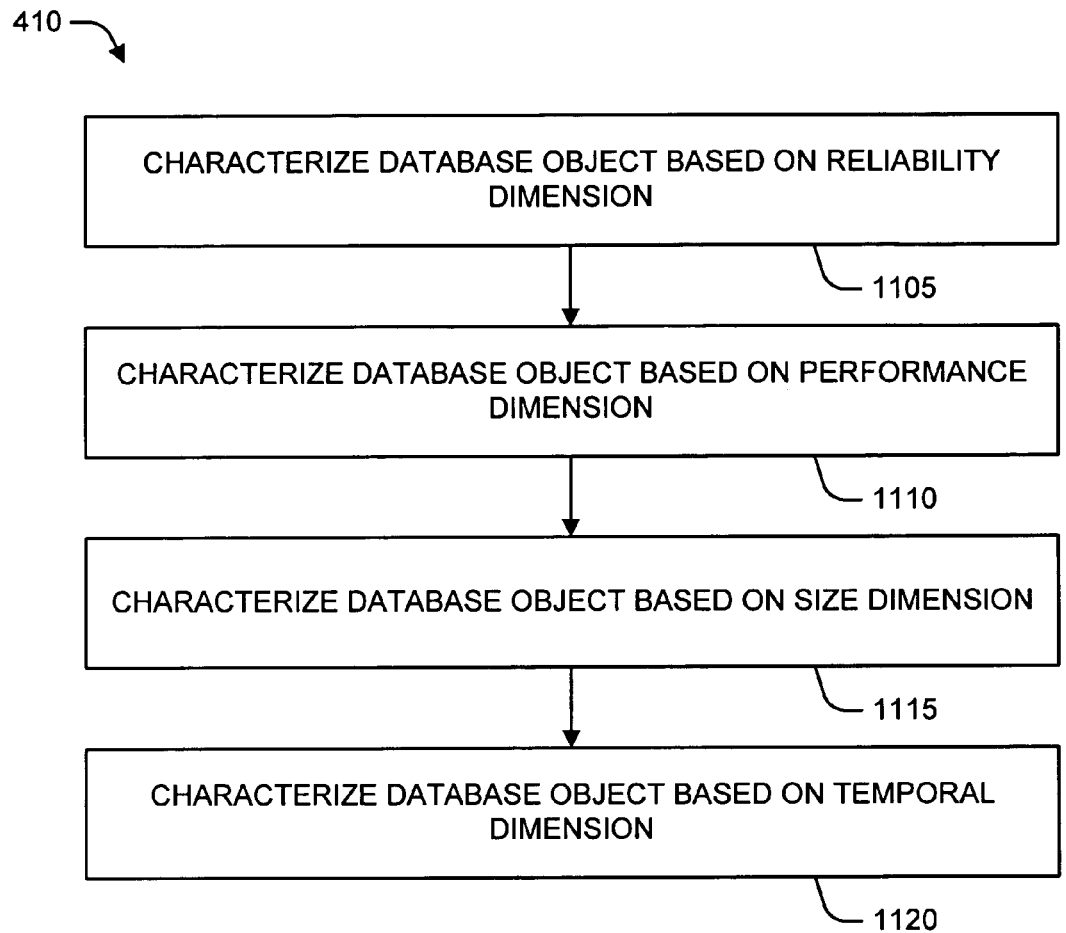

Like the characterization of the DSUs $215_{1,1 \ldots N,M}$ (block 410, FIG. 4) discussed above, the database object protection system also characterizes the database object that is being protected based on one or more dimensions (block 415). An example system of characterizing the database object based on one or more dimensions (block 415) is shown in FIG. 11. The example system characterizes the database object based on a reliability dimension (block 1105, which is shown in greater detail in FIG. 12), a performance dimension (block 1110, which is shown in greater detail in FIG. 13), a size dimension (block 1115), and a longevity dimension (block 1120). In certain implementations, one or more of block 1105-1115 are omitted. Other example systems may characterize the protection information in addition to, or in place of, the database object.

Figure 12:
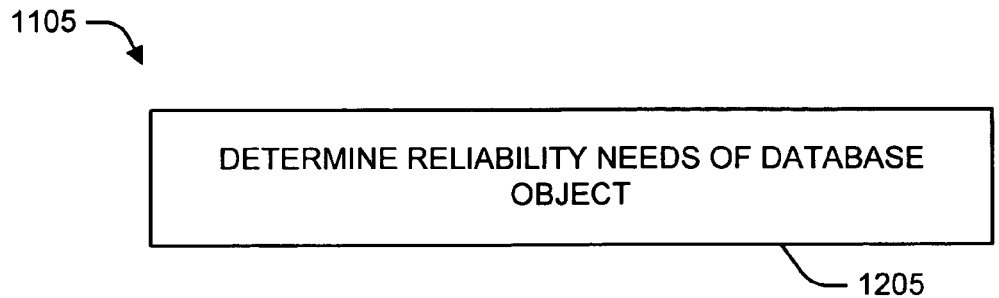

As discussed with respect to the reliability dimension of the DSU 215, the reliability dimension of the database object generally includes both the continued availability and the continued existence and integrity of the database object. In certain implementation, the reliability dimension is split into sub-dimensions for characterization. An example system for characterizing the reliability dimension of the database object (block 1105) is shown in FIG. 12. The system determines the reliability needs of the database object (block 1205). In some example systems, this dimension is based on one or more of user input data and statistics.

Figure 13:
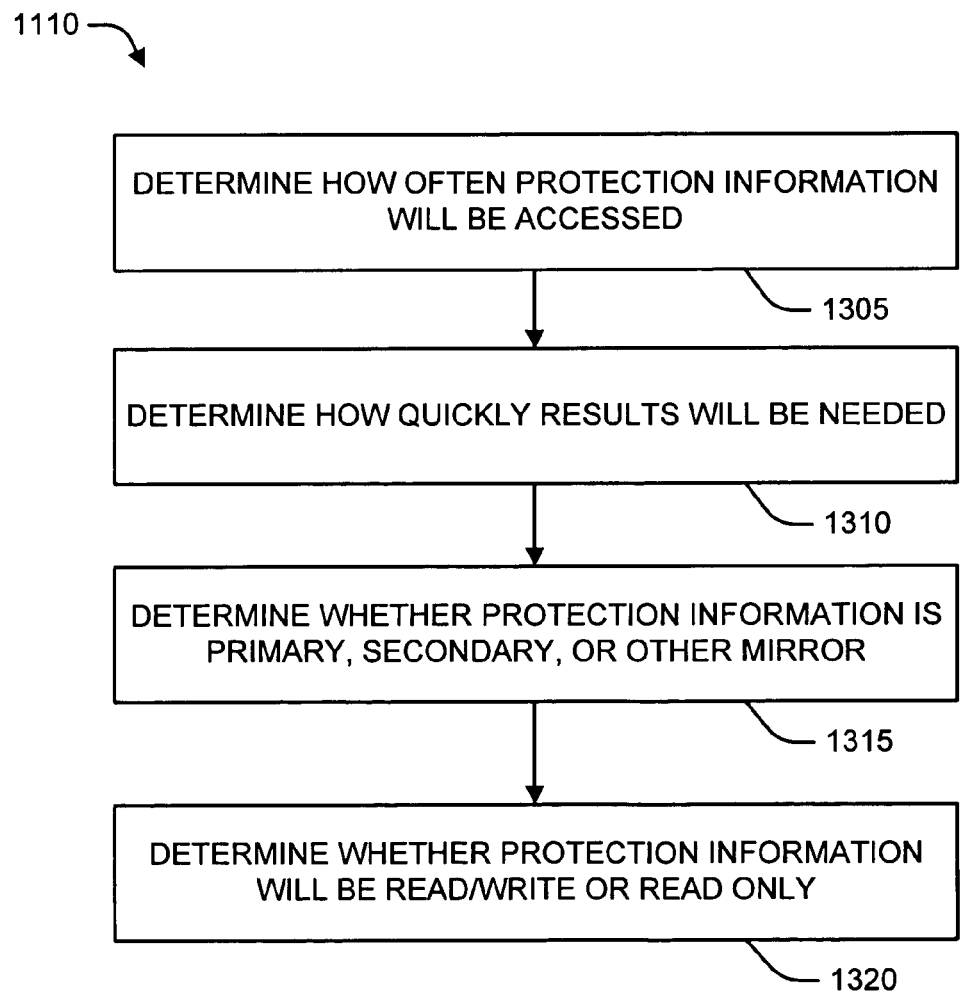

An example system for characterizing the performance dimension of the database object (block 1110) is shown in FIG. 13. The system determines how often the protection information for the database object will be accessed (block 1305). The system determines how quickly results will be needed from a query of the protection information (block 1310). The system determines whether the protection information being stored is a primary mirror or other copy of the object (block 1315). The system determines whether the protection information will be read/write or only read (block 1320). In certain implementations, one or more of block 1305-1320 are omitted.

Figure 14:
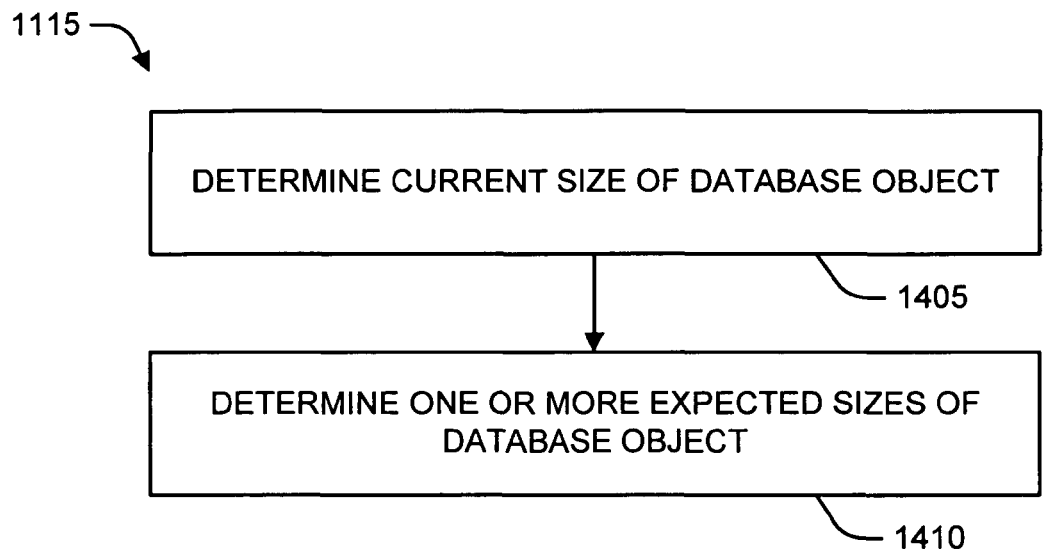
Figure 15:
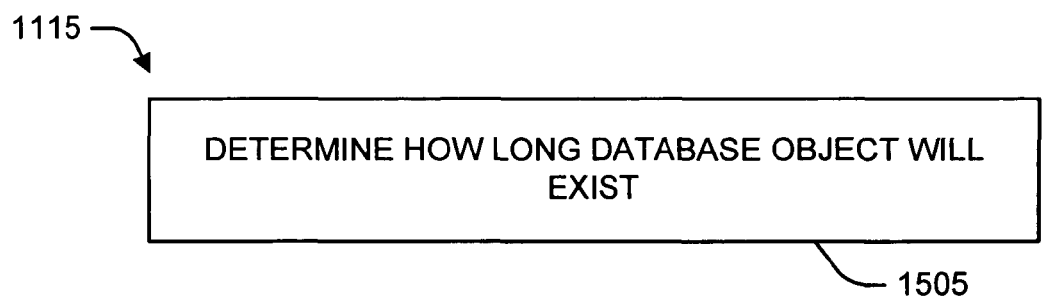

An example system for characterizing the size dimension of the data base object (block 1115) is shown in FIG. 14. The system determines the current size of the database object (block 1405). An example system for characterizing the longevity dimension of the database object determines one or more expected sizes of the database object (block 1505, FIG. 15).

Figure 16:

In certain implementations, the system considers a cost dimension to place the protection information on the DSU 215 (block 415). An example system to characterize the cost dimension is shown in FIG. 16. The system determines a cost to place the database object on the DSU 215 (block 1605). In some implementations, the cost includes one or more of the time to place the database object on the DSU 215, the bandwidth to place the database object on the DSU 215, and the scarcity or monetary cost of the DSU 215. In certain implementations the DSUs $215_{1,1\ldots N,M}$ include one or more RAM disks or solid-state disks, which typically provide exceptional performance, but have a high monetary cost relative to other media. In some implementations, this media scarcity or monetary cost is incorporated in the cost dimension.

Figure 17:
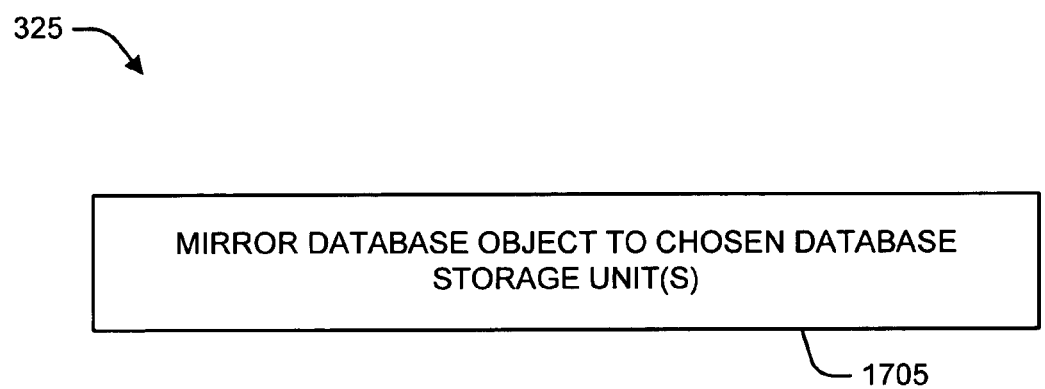

Returning to FIG. 3, the database object protection system places the protection information for the database object on the one or more selected DSUs (block 325). An example system for placing the protection information on the one or more selected DSUs $215_{1,1\ldots N,M}$ is shown in FIG. 17. The example system mirrors the database object to the one or more chosen $215_{1,1\ldots N,M}$ (block 1705). Other example systems store a subset of the database object on the one or more selected DSUs $215_{1,1\ldots N,M}$. Other example systems store parity information for the database object on the one or more selected one or more selected DSUs $215_{1,1\ldots N,M}$.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of protecting one or more database objects including:
    designating one or more database objects for protection;
    characterizing the one or more database objects designated for protection based on a set of dimensions;
    characterizing one or more data storage units by a set of dimensions; and
    for one or more database objects designated for protection:
        selecting one or more data storage units to store protection information for the database object based on a comparison of the set of dimensions for the database object designated for protection and the set of dimensions for the data storage units; and
        storing protection information for the database object designated for protection in the one or more selected data storage units.

2. The method of claim 1, where characterizing one or more data storage units by a set of dimensions includes:
    characterizing one or more data storage units by a reliability dimension.

3. The method of claim 2, where characterizing one or more data storage units by the reliability dimension includes:
    characterizing one or more data storage units based on one or more characteristics of each data storage unit selected from a group consisting of:
        a Mean Time Between Failures (MTBF);
        a number of data paths connected to the data storage unit;
        a cabinet that houses the data storage unit;
        the interconnects of the cabinet that houses the data storage unit;
        a chassis that houses the data storage unit;
        the data storage facility that houses the data storage unit;
        whether the data storage unit supports atomic writes;
        whether the data storage unit is volatile;
        whether the data store unit is path failure protected; and
        one or more power grids connected to the data storage unit.

4. The method of claim 1, where characterizing one or more data storage units by a set of dimensions includes:
    characterizing one or more data storage units by a performance dimension.

5. The method of claim 4, where characterizing one or more data storage units by a performance dimension includes:
    characterizing one or more data storage units based on one or more characteristics of each data storage unit of selected from a group consisting of:
        a seek time;
        a transfer rate;
        a rotational speed;
        one or more response time statistics; and
        one or more expected response time as the data storage unit is filled, one or more interconnect speeds.

6. The method of claim 4, where characterizing one or more data storage units by a performance dimension includes:
    characterizing one or more data storage units by an Input/Output mix by one or more of a read/write mix or a request size mix.

7. The method of claim 1, where characterizing one or more data storage units by a set of dimensions includes:
    characterizing one or more data storage units by a capacity dimension.

8. The method of claim 1, where characterizing one or more data storage units by a set of dimensions includes:
    characterizing one or more data storage units by a longevity dimension.

9. The method of claim 1, where characterizing one or more data storage units by a set of dimensions includes:
    characterizing two or more data storage units by a common fault dimension.

10. The method of claim 1, where characterizing one or more database objects by a set of dimensions includes:
    characterizing one or more database objects based on a reliability dimension.

11. The method of claim 1, where characterizing one or more database objects by a set of dimensions includes:
    characterizing one or more database objects based on a performance dimension.

12. The method of claim 1, where characterizing one or more database objects by a set of dimensions includes:
    characterizing one or more database objects based on a size dimension.

13. The method of claim 1, where characterizing one or more database objects by a set of dimensions includes:
    characterizing one or more database objects based on a longevity dimension.

14. The method of claim 1, further including:
determining a cost to store the recovery information to one or more data storage units.

15. The method of claim 1, where storing protection information in the one or more date storage units includes:
mirroring the database object on the one or more data storage units.

16. A computer program, stored on a tangible storage medium, for use in protecting one or more database objects, the computer program including executable instructions that cause a computer to:
designate one or more database objects for protection;
characterize the one or more database objects designated for protection based on a set of dimensions;
characterize one or more data storage units by a set of dimensions; and
for one or more database objects designated for protection:
select one or more data storage units to store protection information for the database object based on a comparison of the set of dimensions for the database object designated for protection and the set of dimensions for the data storage units; and
store protection information for the database object designated for protection in the one or more selected data storage units.

17. The computer program of claim 16, where the instructions to characterize one or more data storage units by a set of dimensions includes:
characterize one or more data storage units by a reliability dimension.

18. The computer program of claim 17, where the instructions to characterize one or more data storage units by the reliability dimension further cause the computer to:
characterize one or more data storage units based on one or more characteristics of each data storage unit selected from a group consisting of:
a Mean Time Between Failures (MTBF);
a number of data paths connected to the data storage unit;
a cabinet that houses the data storage unit;
the interconnects of the cabinet that houses the data storage unit;
a chassis that houses the data storage unit;
the data storage facility that houses the data storage unit;
whether the data storage unit supports atomic writes;
whether the data storage unit is volatile;
whether the data store unit is path failure protected; and
one or more power grids connected to the data storage unit.

19. The computer program of claim 16, where the instructions to characterize one or more data storage units by a set of dimensions further cause the computer to:
characterize one or more data storage units by a performance dimension.

20. The computer program of claim 19, where the instructions to characterize one or more data storage units by a performance dimension further cause the computer to:
characterize one or more data storage units based on one or more characteristics of each data storage unit of selected from a group consisting of:
a seek time;
a transfer rate;
a rotational speed;
one or more response time statistics;
one or more expected response time as the data storage unit is filled; and
one or more interconnect speeds.

21. The computer program of claim 19, where the instructions to characterize one or more data storage units by a performance dimension further cause the computer to:
characterize one or more data storage units by an Input/Output mix by one or more of a read/write mix or a request size mix.

22. The computer program of claim 16, where the instructions to characterize one or more data storage units by a set of dimensions further cause the computer to:
characterize one or more data storage units by a capacity dimension.

23. The computer program of claim 16, where the instructions to characterize one or more data storage units by a set of dimensions further cause the computer to:
characterize one or more data storage units by a longevity dimension.

24. The computer program of claim 16, where the instructions to characterize one or more data storage units by a set of dimensions further cause the computer to:
characterize two or more data storage units by a common fault dimension.

25. The computer program of claim 16, where the instructions to characterize one or more database objects by a set of dimensions further cause the computer to:
characterize one or more database objects based on a reliability dimension.

26. The computer program of claim 16 where the instructions to characterize one or more database objects by a set of dimensions further cause the computer to:
characterize one or more database objects based on a performance dimension.

27. The computer program of claim 16, where the instructions to characterize one or more database objects by a set of dimensions further cause the computer to:
characterize one or more database objects based on a size dimension.

28. The computer program of claim 16, where the instructions to characterize one or more database objects by a set of dimensions further cause the computer to:
characterize one or more database objects based on a longevity dimension.

29. The computer program of claim 16, where the executable instructions further cause the computer to:
determine a cost to store the recovery information to one or more data storage units.

30. The computer program of claim 16, where the executable instruction to store protection information in the one or more date storage units further cause the computer to:
mirror the database object on the one or more data storage units.

31. An information handling system including:
one or more controllers;
one or more data storage facilities including one or more data storage units, each of the one or more controllers providing access to one or more data storage facilities;
a process for execution on one or more of the controllers for allocating one or more database objects to one or more data storage units, the process including:
designating one or more database objects for protection;
characterizing the one or more database objects designated for protection based on a set of dimensions;
characterizing one or more data storage units by a set of dimensions; and
for one or more database objects designated for protection:
selecting one or more data storage units to store protection information for the database object based on a comparison of the set of dimensions for the database object designated for protection and the set of dimensions for the data storage units; and storing protection information for the database object designated for protection in the one or more selected data storage units.

32. The information handling system of claim 31, where characterizing one or more data storage units by a set of dimensions includes:

characterizing one or more data storage units by a reliability dimension.

33. The information handling system of claim 32, where characterizing one or more data storage units by the reliability dimension includes:

characterizing one or more data storage units based on one or more characteristics of each data storage unit selected from a group consisting of:

a Mean Time Between Failures (MTBF);

a number of data paths connected to the data storage unit;

a cabinet that houses the data storage unit;

the interconnects of the cabinet that houses the data storage unit;

a chassis that houses the data storage unit;

the data storage facility that houses the data storage unit;

whether the data storage unit supports atomic writes;

whether the data storage unit is volatile;

whether the data store unit is path failure protected; and one or more power grids connected to the data storage unit.

34. The information handling system of claim 31, where characterizing one or more data storage units by a set of dimensions includes:

characterizing one or more data storage units by a performance dimension.

35. The information handling system of claim 34, where characterizing one or more data storage units by a performance dimension includes:

characterizing one or more data storage units based on one or more characteristics of each data storage unit of selected from a group consisting of:

a seek time;

a transfer rate;

a rotational speed;

one or more response time statistics; and one or more expected response time as the data storage unit is filled, one or more interconnect speeds.

36. The information handling system of claim 34, where characterizing one or more data storage units by a performance dimension includes:

characterizing one or more data storage units by an Input/Output mix by one or more of a read/write mix or a request size mix.

37. The information handling system of claim 31, where characterizing one or more data storage units by a set of dimensions includes:

characterizing one or more data storage units by a capacity dimension.

38. The information handling system of claim 31, where characterizing one or more data storage units by a set of dimensions includes:

characterizing one or more data storage units by a longevity dimension.

39. The information handling system of claim 31, where characterizing one or more data storage units by a set of dimensions includes:

characterizing two or more data storage units by a common fault dimension.

40. The information handling system of claim 31, where characterizing one or more database objects by a set of dimensions includes:

characterizing one or more database objects based on a reliability dimension.

41. The information handling system of claim 31, where characterizing one or more database objects by a set of dimensions includes:

characterizing one or more database objects based on a performance dimension.

42. The information handling system of claim 31, where characterizing one or more database objects by a set of dimensions includes:

characterizing one or more database objects based on a size dimension.

43. The information handling system of claim 31, where characterizing one or more database objects by a set of dimensions includes:

characterizing one or more database objects based on a longevity dimension.

44. The information handling system of claim 31, where the process further includes:

determining a cost to store the recovery information to one or more data storage units.

45. The information handling system of claim 31, where storing protection information in the one or more date storage units includes:

mirroring the database object on the one or more data storage units.

* * * * *